Dec. 14, 1954     R. C. KOHRN     2,696,642
METHOD OF MAKING WALLS OR THE LIKE IN HOLLOW ARTICLES
Filed Aug. 3, 1953
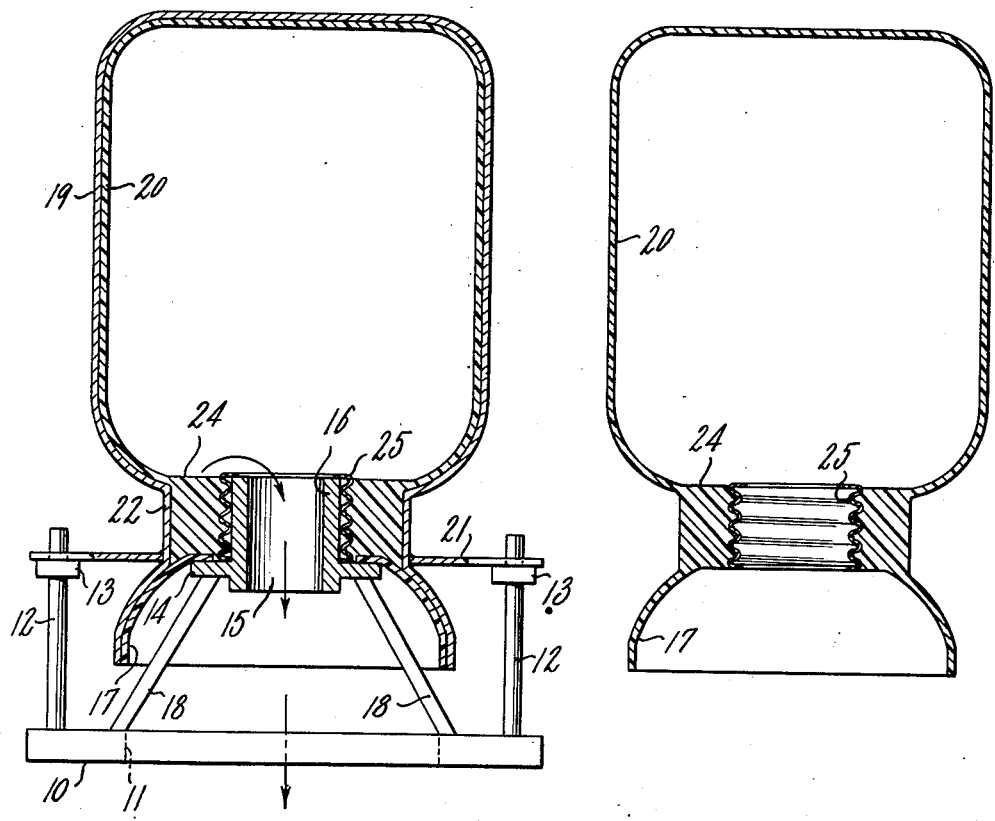
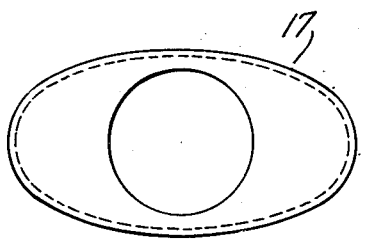
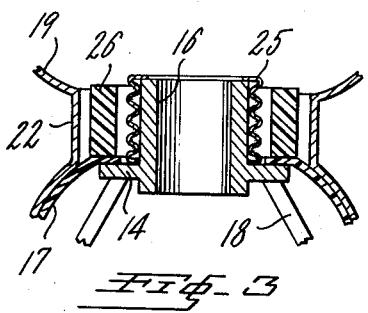
INVENTOR.
ROBERT C. KOHRN
BY
ATTORNEY United States Patent Office 2,696,642
Patented Dec. 14, 1954

2,696,642

METHOD OF MAKING WALLS OR THE LIKE IN HOLLOW ARTICLES

Robert C. Kohrn, Pawtucket, R. I., assignor to United States Rubber Company, New York, N. Y., a corporation of New Jersey Application August 3, 1953, Serial No. 371,991

6 Claims. (Cl. 18—58)

This invention relates to a method of providing hollow slush molded articles with an integral internal wall or the like, and more particularly it relates to a method of providing hollow slush molded articles such as hot water bottles with an integral internal plug fitting which partially closes a neck of the article.

Rubber-like hollow articles have been produced heretofore by the slush molding process. In carrying out this process, a hollow metal mold is used which has an internal configuration corresponding to the external configuration desired in the hollow article. This hollow metal mold is filled to slightly above the height desired in the finished article with a creamy plastic material which is to produce the rubber-like article. The walls of the mold then may be heated, or they can have been heated previously, to cause a relatively thin layer of the plastic material to solidify thereon. When a layer of desired thickness is built up on the walls of the mold, the remaining creamy plastic material is poured therefrom, and the mold with the plastic deposit on its inner surfaces is heated to gel and fuse the plastic material. Thereafter, the fused plastic deposit is stripped from the inner walls of the mold and trimmed where necessary to produce a finished product ready for use.

It has been proposed to make hot water bottles by this method, and the copending application of Streed et al., 315,274, filed October 17, 1952, discloses such a method of making hot water bottles.

As is well known, hot water bottles are provided with a wall in the neck thereof which largely closes this neck so that a small removable plug may be installed therein to facilitate filling and emptying of the bottles yet to provide means for retaining the fluid therein when the article is in use. Heretofore it has not been easy to supply hot water bottles with these plug walls because of the peculiar shape of the bottle when the wall is installed.

This invention contemplates a method whereby such a wall may be formed in these hollow slush molded articles which will form an integral part of the bottle, and which can be produced by an extremely simple method. Since the plug wall thus formed is an integral part of the wall of the article, it is much less likely to leak at the juncture of these two walls after extended usage of the bottle. At the same time, by this method it is possible to provide this plug wall with a screw threaded hollow sleeve or ferrule which is adapted to receive a screw threaded plug to close the bottle after it is filled.

In the method of the present invention, a hollow heated metal mold is filled to the desired height with a creamy plastic material. This material preferably is a vinyl plastisol which is prepared by dispersing finely divided polyvinyl resin powder in a liquid plasticizer therefor to form a creamy liquid. The preparation of the plastisols and their use are well known by those skilled in the art, and are described in detail in an article appearing in Modern Plastics 26, 78 (April 1949) by Perrone and Neuwirth.

After a seamless wall of the plastic material having the desired thickness is deposited on the walls of the mold, the remaining liquid is poured from the mold. While heretofore this liquid has merely been poured from the open end of the mold, in accordance with this invention a solid support or dam having a central opening therethrough is provided on which the mold may be inverted. This dam generally has a peripheral configuration of a cross-section through the neck of the mold, and it carries a sheet of the plastic material which has its outer edges extending beyond the outer edges of the support. This sheet has a hole therethrough which registers with the hole in the support. The support is provided with a hollow sleeve which extends upwardly from this support through the central opening in the plastic sheet to close off the opening through the support except through this hollow sleeve. Preferably this sleeve supports a threaded ferrule which is to form a part of the closure wall of the bottle.

In accordance with this invention, the mold is upended on this support so that the support projects into the neck of the mold with the edges of the sheet which overhang the support contacting the internal walls of the mold or the walls of the article formed therein. In this manner there is formed in the neck of the mold between the upstanding hollow sleeve or ferrule and the wall of the mold a channel which is bottomed by the plastic sheet that is held by the support. Creamy liquid remaining in the mold drains into this channel to be held therein, and any excess flows over the upper end of the upstanding hollow sleeve or ferrule to drain through the opening in the sleeve and out of the mold.

After the excess liquid has drained from the mold, heat is applied to the mold while it is thus inverted to fuse the plastic material deposited on the wall of the mold, and the plastic material in the channel, and the plastic sheet, into a unitary seamless article. The plastic in the channel thus forms a plug wall integral with the bottle. The mold may then be removed from the support and the bottle stripped from the mold. After trimming any excess material from the upper end of the bottle, the plug wall formed by the channel may be provided with a plug, and the bottle having the integral plug wall is ready for use.

For a better understanding of the present invention, reference should be had to the following detailed description thereof when read in conjunction with the accompanying drawing, wherein:

Fig. 1 is a side elevation showing the mold in section which illustrates the step of this method wherein the hollow mold is upended on the support;

Fig. 2 is a plan view of the plastic sheet on the support;

Fig. 3 is a sectional view of a modified plug wall forming member in which the plastic sheet also supports an elliptical insert, and Fig. 4 is a cross sectional view through a completed hot water bottle made in accordance with this invention.

Referring now to the drawings, and particularly to Fig. 1, there is shown apparatus which may be used to carry out the method of the instant invention. The apparatus there shown comprises a supporting base 10 which has the hole 11 therethrough disposed centrally of the supporting base. Projecting upwardly from this supporting base at either side thereof are the guiding posts 12 which are adapted to guide the hollow metal mold into position on the supporting dam shown in this figure. These supporting posts 12 carry stops 13 thereon which are adapted to position and support the upended mold as will be explained more fully hereinafter. Struts 18 project upwardly from the base 10 and carry over the hole 11 a supporting dam 14 which has generally the shape of the neck of the mold. This dam 14 has an opening 15 through its center and carries in this hole an upstanding wall formed by the hollow cylindrical sleeve 16. In the embodiment shown in the drawings, this hollow sleeve 16 is shown as integral with the supporting dam 14.

To practice the method of this invention using this structure, a generally elliptically shaped sheet 17 is first placed over the supporting dam 14. As is best shown in Figs. 1 and 2, this sheet 17 has a hole through its center registering with the hole 15 through the dam 14, so that the sheet 17 may be laid on the dam 14 to have the upstanding sleeve 16 projecting upwardly therethrough. The sheet 17 should be larger than the dam 14 so that its outer edges overhang the edges of the dam 14 to contact the walls of the mold in which the article is to be formed. In the embodiment shown in the drawing wherein the invention is used to make hot water bottles, this sheet 17 has been given a size to overhang the dam 14 sufficiently to form the customary top of the hot water bottle above the plug wall. With the sheet 17 thus positioned on the dam 14, a mold 19 wherein an article 20 has been formed on the internal walls thereof by a slush molding technique such as that disclosed in the above-identified Streed et al. application is upended on the dam 14. In the embodiment shown in the drawings a pair of arms 21 fixed to the mold 19 and having holes therein adapted to register with the posts 12 are provided for supporting the mold 19 in position on the dam 14. The supporting stops 13 on the posts 12, as shown in Fig. 1, are positioned on the posts so that the arms 21 will support the mold 19 about the dam 14 with the upper surface of the dam 14, hence the sheet 17, at the neck of the mold, and with the edges of the sheet 17 in contact with the walls of the mold 19. The upstanding hollow sleeve 16 will therefore project upwardly from the dam 14 into the neck of the mold, and a channel will be formed between the neck 22 of the mold and the hollow sleeve 16 which is bottomed by the sheet 17 supported by the dam 14.

To form the wall, the mold 19 should be upended on the dam 14 while it still contains some plastisol which is sufficiently fluid to flow into the thus formed channel. Therefore the mold 19 may be upended on the dam 14 after the article 20 has been formed on its falls and while the mold is still full of plastisol. However, to prevent undue wastage of the plastisol and fouling of the support 10 and its appurtenant structure, it is preferred to drain partially the mold before upending it on the support. When the mold is thus upended, the plastisol will drain along its walls into the channel formed by the upstanding sleeve 16 and the neck of the mold 22 which is bottomed by the sheet 17. The plastisol which thus drains into this channel will be held therein by the sheet 17 on the dam 14 which seals against the mold 19. It will be evident that by a judicious control of the amount of plastisol retained in the mold 19 when it is upended on the dam, the thickness of the plug wall which will thus be formed may be controlled. However, it will be found generally to be easier to control the thickness of this plug wall by varying the height of the projection of the hollow sleeve 16 above the dam 14 and to maintain an excess of plastisol in the mold 19 when it is upended on the dam. When this is done, the plastisol will drain into the channel to fill it and then will drain over the edges of the hollow sleeve 16 to drain therethrough as indicated by the arrows in Fig. 1 and thence through the opening 11 in the support 10 to a usual container (not shown) where it is caught to be used in forming additional articles as is customary in slush molding. After a deposit of plastic having the desired thickness is thus formed in the channel, heat is applied to the mold 19 to fuse the plastic material 20 on the walls thereof and the plastic material 24 trapped in the channel thereof into a unitary article. After the material has thus been fused, the mold may be removed from the dam 14 and the article stripped from its inner walls and trimmed to form the completed hot water bottle.

In making hot water bottles according to this invention, it is preferred to form the sheet 17 of a plastic material which is the same material as that forming the plastisol which is to be used in making the hot water bottle. When the sheet 17 is made of this material, it may be fused with the plastisol to form an integral part of the hot water bottle as best shown in Figs. 1 and 4. A suitable material, and the one that is preferred, for making hot water bottles by this method would be a plastisol of vinyl resin. In this case, the sheet 17 would be a sheet of fused vinyl resin.

In hot water bottles, it is often desirable to provide the plug wall with a screw threaded ferrule which is adapted to receive the customary threaded plug to close the neck of the bottle. This can be done readily in accordance with this invention, by simply supporting a ferrule 25 on the dam 14 about the upstanding sleeve 16 in a position to be molded into the neck of the hot water bottle when the resin in the channel is fused. Consequently, the material 24 in this channel surrounds and molds this ferrule in position in the wall to receive the usual threaded plug as best shown in Fig. 4.

In Fig. 3 there is shown means for practicing a modified form of this invention in which the heat necessary to fuse the plastic material in the upended mold is reduced. In this form of the invention, the channel formed by the sleeve 16, the neck 22 of the mold, and the sheet 17 is partially filled by an elliptical ring 26 which is placed in this channel to stand on the sheet 17. This elliptical ring 26 is of such a size as to substantially fill this channel yet to leave a small clearance between the ring 26 and the sides 22 and 25 of the channel. When a mold is upended on the dam 14 which supports such an elliptical ring, the plastisol will flow down into the spaces between the ring and the ferrule 25 and between the ring and the wall of the mold 22. In this method when the plastic is fused to form the hot water bottle, it will only be necessary to fuse the relatively small amount of plastisol which has filled the void spaces in the channel left by the ring 26 because the ring is already fused. Accordingly, the heating step may be materially speeded up by use of the method illustrated in Fig. 3.

Although the method of this invention has been described with specific reference to articles slush molded of vinyl resin plastisols, and although these materials are preferred in practicing this invention, it will be apparent to those skilled in this art that other resins and other liquid forms of resins may be used in practicing this invention in its broader aspects, so long as they are capable of being slush molded, and that these materials may be solidified on the walls of the mold and in the channel by techniques, such as gelling, polymerizing, cooling, etc., appropriate to the particular material used.

Having thus described my invention, what I claim and desire to protect by Letters Patent is:

1. The method of making an integral plug fitting or the like in hollow slush molded articles, which comprises supporting a sheet in a substantially horizontal position, supporting a wall extending vertically from an edge of the sheet, upending a hollow mold containing a resinous material in liquid form therein on the sheet so an edge of the sheet is adjacent the inner wall of the hollow mold to form a channel between the vertically extending wall and the mold which is bottomed by the sheet, allowing the resinous material to drain into the channel, and solidifying the resinous material on the inner wall of the mold and in the channel into a unitary article holding the sheet.

2. The method of making an integral plug fitting or the like in hollow slush molded articles, which comprises supporting a resinous sheet above a supporting structure, supporting an annular wall extending vertically from an edge of the resinous sheet, upending a hollow heated mold containing a plastisol therein on the resinous sheet so an edge of the sheet is adjacent the inner wall of the hollow mold to form a channel between the vertically extending annular member and the mold which is bottomed by the resinous sheet, allowing the plastisol to drain from said mold into said channel and over the upper edge of the annular wall to drain from the mold through the opening in the annular wall, and fusing the resinous sheet and the plastisol on the inner wall of the mold and in the channel into a unitary article.

3. The method of making an integral plug fitting or the like in hollow slush molded articles, which comprises supporting a resinous sheet on a supporting dam with the edges of the sheet overhanging the outer edge of the dam, supporting a wall forming member adapted to form a wall of the molded article vertically and extending above the inner edge of the sheet, upending a hollow heated mold containing a plastisol on the dam so that the resinous sheet is adjacent the wall of the mold to form a channel between the wall forming member and the wall of the heated mold which is bottomed by the resinous sheet, allowing the plastisol to drain into said channel to fill the same and excess plastisol to drain out of the hollow mold over said wall forming member, and fusing the formed resin on the wall of the mold and the resin in the channel and the resinous sheet into a unitary article having the wall forming member fixed to the resin in the channel.

4. In the method of molding hollow articles wherein the article is slush molded on the inner walls of a hollow heated mold, the method of molding an integral plug fitting in a neck of the article which comprises supporting a sheet of resinous material having an opening therein on a supporting dam having a registering opening so the edges of the sheet overhang the outer edges of the dam, supporting a screw threaded ferrule on an upstanding hollow sleeve which extends through the registering holes in the dam and resinous sheet and closes off the central opening through the dam, upending a heated mold on said dam so the walls of the mold neck are adjacent the resinous sheet to form a channel between the ferrule and the walls of the article which is bottomed by the resinous sheet, allowing plastisol remaining in the mold to drain into the channel and overflow the ferrule to drain through the sleeve, and heating the mold while in its inverted position to fuse the resin on the walls of the mold and in said channel and the sheet into a unitary article having a plug in its neck which holds a screw threaded ferrule.

5. In a method of molding hollow articles wherein the article is slush molded from a plastisol on the inner walls of a heated hollow mold, the method of making a filler plug for the neck of a hot water bottle which comprises upending a heated mold which is partially drained of plastisol on a supported sheet of resinous material having a central hole therein and a ferrule supported in an upstanding position above this central hole, allowing the plastisol to drain into the channel formed by the ferrule, the resinous sheet and the inner walls of the mold, to fill the channel and drain through the opening in the ferrule, and heating the plastisol while the mold is thus inverted to fuse the plastisol on the walls of the mold and in the channel and the sheet into a unitary hot water bottle having a plug wall therein.

6. The method of making a filler plug wall in hot water bottles by a slush molding method, which comprises supporting a vinyl resin sheet having an opening therein on a dam in a manner that the resin sheet overhangs the outer edges of the dam, supporting a ring on said sheet about said hole, supporting a ferrule extending above the sheet and through the ring, upending a partially drained hollow heated mold containing plastisol on the resin sheet so that a channel is formed between the neck of the mold and the ferrule that is bottomed by the sheet and contains the ring, allowing plastisol to drain into the channel, and heating the mold while thus inverted to fuse the plastisol, whereby a plug wall is formed integrally with the slush molded hot water bottle.

References Cited in the file of this patent

UNITED STATES PATENTS

| Number | Name | Date |
|---|---|---|
| 2,161,281 | Carter | June 6, 1939 |
| 2,473,723 | Nelson | June 21, 1949 |

OTHER REFERENCES

"Slush Molding Vinyl Plastisols," Modern Plastics, Oct. 1950, pages 102–104.